United States Patent [19]

Kato et al.

[11] Patent Number: 4,470,108

[45] Date of Patent: Sep. 4, 1984

[54] POSITION DETECTING DEVICE

[75] Inventors: Yoshito Kato; Toshio Hashimoto, both of Aichi; Masatoshi Kimura, Hyogo, all of Japan

[73] Assignee: Mitsubishi Denki Kabushiki Kaisha, Tokyo, Japan

[21] Appl. No.: 326,251

[22] Filed: Dec. 1, 1981

[51] Int. Cl.³ .............................................. G05B 19/19
[52] U.S. Cl. .................................... 364/167; 318/603; 318/626; 364/142; 377/17
[58] Field of Search ............... 364/142, 167, 174, 175, 364/560, 561, 562, 474, 475; 377/2, 15, 16, 17; 318/603, 626, 467, 468

[56] References Cited

U.S. PATENT DOCUMENTS

| 3,584,284 | 6/1971 | Beach | 318/603 X |
| 3,874,205 | 4/1975 | Roch et al. | 364/142 X |
| 3,974,432 | 8/1976 | Thompson | 318/603 X |
| 4,074,177 | 2/1978 | Olig | 364/142 X |
| 4,242,621 | 12/1980 | Spaulding | 318/626 X |
| 4,376,970 | 3/1983 | Ilseman | 364/167 |
| 4,401,930 | 8/1983 | Kato et al. | 318/626 X |

Primary Examiner—Joseph F. Ruggiero
Attorney, Agent, or Firm—Sughrue, Mion, Zinn, Macpeak and Seas

[57] ABSTRACT

Pulses indicating movement distance are frequency divided to a desired resolution and then counted in a microprocessor in accordance with the direction of movement. The position count value addresses a data memory storing switch output data corresponding to desired detection positions.

8 Claims, 10 Drawing Figures

FIG. 4
| POSITION #s | DISTANCE DATA | SWITCH OUTPUT DATA |
|---|---|---|
| 1 | $\ell_1$ | $01_{16}$ |
| 2 | $\ell_2$ | $02_{16}$ |
| 3 | $\ell_3$ | $03_{16}$ |
| 4 | $\ell_4$ | $04_{16}$ |
| 5 | $\ell_5$ | $05_{16}$ |
FIG. 5
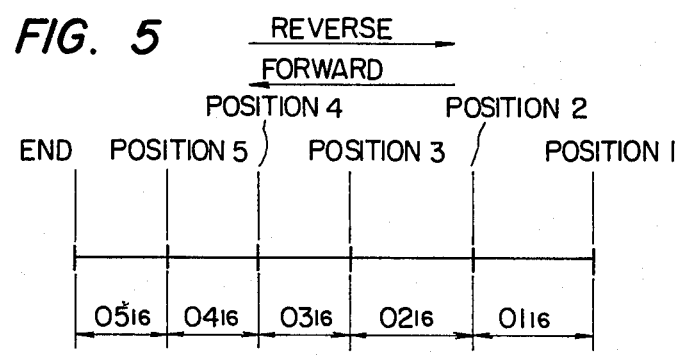
FIG. 6
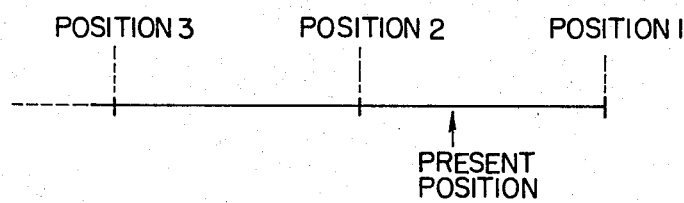

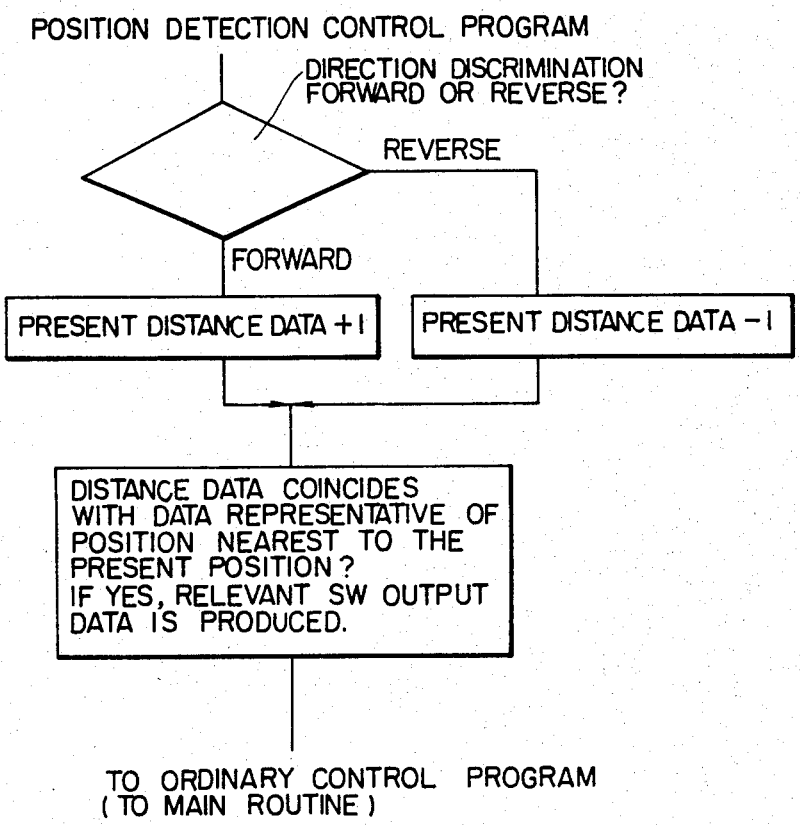

POSITION DETECTING DEVICE

BACKGROUND OF THE INVENTION

This invention relates to a position detecting device employed in an automatic positioning system.

FIG. 1 shows a position detecting system using limit switches which is the most typical of the conventional position detecting systems. For simplification in description, the drive system is not shown in FIG. 1.

As shown in FIG. 1, a moving table 30 has a protrusion 30a which is used to detect the positions of limit switches 31a, 31b and 31c. As the moving table 30 is moved, the protrusion 30a operates the actuators 310 of the limit switches 31a, 31b and 31c, so that switch signals q, r and s are applied to a controller 32.

The position detecting limit switches 31c, 31b and 31a are set at distances $L_1$, $L_2$ and $L_3$ from the original point O, respectively.

The conventional device thus constructed operates as follows. When the moving table 30 is moved in the direction of the arrow to the limit switch 31c at the distance $L_1$ from the original point O, the actuator 310 of the limit switch 31c is operated, and the switch signal s is applied to the controller 32. Similarly when the table 30 reaches the limit switch 31b at the distance $L_2$, the limit switch 31b is operated and the switch signal q is applied to the controller 32. When the table 30 reaches the limit switch 31a at the distance $L_3$, the limit switch 31a is operated and the switch signal r is applied to the controller 32. In response to the switch signals q, r and s, the controller 32 operates to control the driving, stopping or moving speed of the moving table 30.

Even when the controller 32 provides an instruction signal to stop the table 30, the table 30 will overrun a relatively long distance before it is actually stopped, because of the moving table's inertia and the delayed braking operation of the brake member. Accordingly, in this system, the limit switches 31a, 31b and 31c are located somewhat before the desired stopping points.

The overrun distance L can be approximately represented by the following expression:

$$L \approx V\sqrt{M/K}$$

where M is the mass of the moving part of the system, K is the rigidity of the mass in the feed direction, and V is the feed speed. Thus, it is difficult to eliminate the overrun distance L. Therefore, in the conventional system, in order to minimize the overrun distance it is necessary not only to set the limit switches 31a, 31b and 31c before the stop points but also to decrease the feed speed of the moving table 30 at the detection points.

However, the overrun distance varies with the speed of the moving table and it is therefore difficult to determine the proper lead time. In addition, when the table 30 is moved in the opposite direction (or returned), the positions of the limit switches 31a, 31b and 31c will now be somewhat behind the desired stopping points and must be adjusted again.

Position detecting sensors employed in the conventional positioning system can be classified into mechanical types such as a jib, a cam, a link or a gear device; electrical types such as a microswitch or a contactless switch; pneumatic types such as a pneumatic microswitch; or optical types such as a photoelectric switch, a photoelectric linear scale or an optical wave interferometer.

In the case of the mechanical type position detecting sensor, the drive sources (such as a hydraulic drive source and/or an electric motor) are, in general, stopped each time a position is detected. Therefore, the mechanical type position detecting sensor is not suitable for automatic positioning. Even if it were designed so as to be suitable for automatic positioning, it would need considerably intricate mechanical elements. In addition, because of the inertial forces and drive forces of the mechanical elements, other mechanical elements may be deformed or worn. Therefore, with the mechanical type sensor, it is difficult to improve the positioning accuracy, and it is considerably difficult to change the design or to move the detection points as discussed above in the case of reverse direction movement.

A microswitch or a contactless switch has been extensively employed as the electrical type position detecting sensor. The electrical type position detecting sensor is usually a simple on-off type digital detector. With such a position detecting sensor, however, a detection accuracy higher than that defined by the switch configuration cannot be obtained; that is, the detection accuracy is limited by the number and location of switches and cannot be improved. Furthermore, the number of sensors which can be installed over the range of movement of the moving table is limited, and it takes a great deal of time and labor to change the design and to adjust the detection points as discussed above.

In the case of the pneumatic type position detecting sensor, once a positioning point is determined it is considerably difficult to change the positioning point. Also, since an external force is repeatedly imparted to the position detecting element, it is rather difficult to maintain the accuracy unchanged.

In general, the optical type position detecting sensor is low in accuracy. Some high accuracy optical type position detecting sensors are available, but they are considerably expensive. Since the detection accuracy of the sensor is greatly dependent on the selected light source, the adjustment takes time and labor, and it is also difficult to change the positioning point.

Thus, the following characteristics are common in conventional devices:

(1) It takes a great deal of time and labor to set the detection positions;

(2) The number of detection positions is limited by the physical dimensions of the position detecting sensor used, and cannot be increased. The detection accuracy is also limited; and (3) After the detection positions are set, it takes a lot of time and labor to change the detection positions.

A conventional positioning device comprises: a position detecting sensor; and a control unit for driving and controlling the device in response to the output signal of the sensor. The position detecting sensor suffers from the various drawbacks as described above.

SUMMARY OF THE INVENTION

In the invention, in order to eliminate these drawbacks, a rotary encoder or a linear encoder adapted to convert a displacement into a digital signal in the form of a pulse train is employed as the position detecting sensor, and in order to process the pulse train, a position detecting device according to a stored program system is interposed between the position detecting sensor and the aforementioned control unit. Thus, the position detecting sensor which heretofore has only functioned as a passive element is allowed to have a decision function, and a position detecting device as an active element is realized according to the invention. Accordingly, the position detecting device is high in response, free from detection error and high in accuracy.

In the position detecting device according to this invention, a plurality of switch outputs can be provided for each of plural position detection points independently of the other devices, and the detection points can be readily changed. Therefore, the time and labor required to change the position detection points is minimized, which is one of the drawbacks accompanying the conventional device.

Owing to the arrangement of the position detecting device according to the stored program system, the position detecting device can also perform all or a part of the functions of the conventional control unit. Thus, the position detecting device of the invention contributes to lower manufacturing costs.

Briefly, the present invention employs a pulse train representative of the amount and direction of movement to keep track of the moving table or other object. The system is present to absolute zero at some predetermined position and thereafter a counter is incremented or decremented in accordance with object movement. A memory stores the information as to what count values correspond to desired detection points depending on the direction of movement, the speed of movement, etc.

BRIEF DESCRIPTION OF THE DRAWINGS

One embodiment of this invention will be described with reference to the accompanying drawings, in which:

FIG. 4 is a table indicating relationships between the position numbers and switch output data;

FIG. 5 is an explanatory diagram showing relationships between the position numbers and the corresponding switch output data;

FIG. 6 is an explanatory diagram for a description of a closest position detection system;

FIG. 10 is a diagram showing a position detecting program.

DETAILED DESCRIPTION OF THE INVENTION

Figure 2:
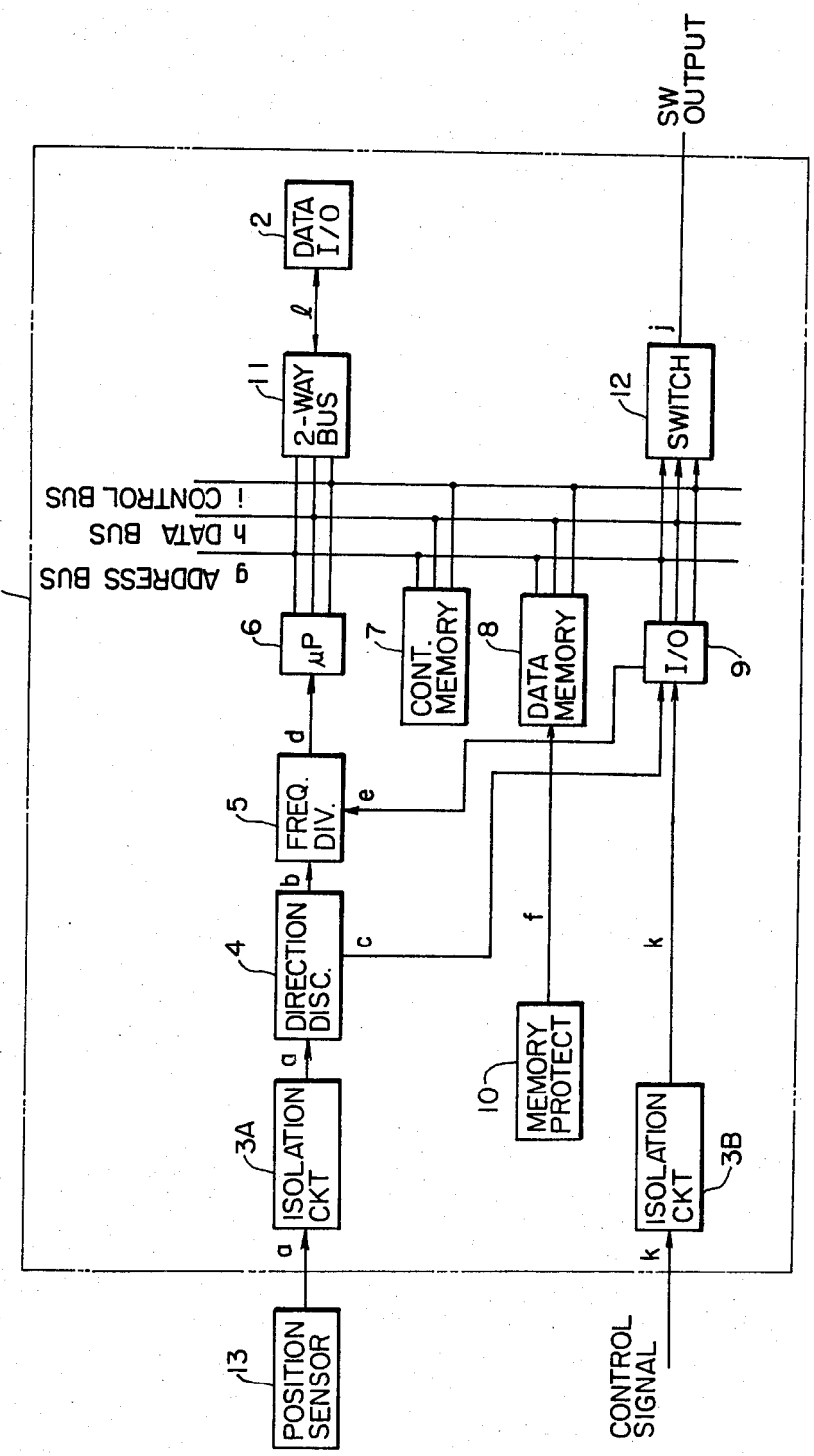
FIG. 2 is a block diagram showing a position detecting system according to a stored program system according to the present invention.

FIG. 2 shows a position detecting device 1 according to the stored program system of this invention. In FIG. 2, reference numeral 13 designates a position detecting sensor adapted to convert position variations into a pulse train a which includes forward rotation pulses and reverse rotation pulses. The pulse train a is applied through an input/output isolation circuit 3A to a direction discriminating circuit 4, where it is separated into distance measuring pulse signal b and a direction discriminating signal c. The distance measuring pulse signal b is applied to a programmable frequency divider 5, where it is frequency-divided according to a predetermined frequency division ratio. The output of the programmable frequency divider 5 is applied, as an interruption pulse signal d, to a micro-processor 6. The frequency division ratio is determined by a frequency division ratio selecting signal e provided by a programmable input/output circuit 9, e.g. under control of the microprocessor 6. In response to the interruption pulse signal d, the microprocessor 6 is operated to execute a control program stored in a control memory 7, so that position, distance and switch output data stored in a data memory 8 are controlled and a predetermined switch output j is selected out of a switch output circuit 12. The switch output j can then be used as the position detection signal in a known manner and/or as a control signal. An external control signal k is isolated by an input/output isolation circuit 3B. A data memory protecting circuit 10 outputs a data protecting signal f to protect the position, distance and switch output data stored in the data memory 8 when the power switch is turned on or off or when the electric supply is momentarily interrupted. A data input/output device 2 is coupled through a two-way bus coupler 11 to an address bus g, a data bus h and a control bus i, so that a plurality of position detection points and a plurality of switch outputs corresponding to positions can be set in advance. These set data are permanently stored and held in the data memory, unless otherwise renewed or replaced.

The position detecting sensor 13 is adapted to convert a variation in position into an electrical signal, as was described above. More specifically, the sensor 13 converts a displacement into a digital signal in the form of a pulse train. A rotary encoder or a linear encoder, both of which are commonly known, may be employed as the sensor 13.

In the linear encoder, a detecting head detects a steel unit which moves linearly with the object being positioned, the steel unit having a magnetic scale thereon which the head converts into a pulse train indicating displacement along a straight line. On the other hand, the rotary encoder is coupled either directly or through a reduction gear to a ball screw or the like of an industrial machine, to rotate therewith and produce a predetermined number of pulses whenever the ball screw makes one revolution or one pitch. In this case, straight displacement caused by the ball screw can be detected by counting the number of pulses thus produced.

For example, for purposes of this explanation it will be assumed that the rotary encoder is coupled directly to the ball screw and the ball screw's pitch is 10 mm and the rotary encoder's resolution is 600 pulses/revolution, so that the rotary encoder provides 60 pulses/mm of linear movement. If the desired distance resolution is 0.05 mm or 20 pulses/mm of linear movement, then 10 mm/0.05 mm=200 pulses per revolution. Therefore, measurement can be achieved with a displacement of 0.05 mm per pulse by frequency-dividing a pulse train of 600 pulses/revolution provided by the rotary encoder down to a pulse train of 200 pulses/revolution, i.e. divide-by-three operation.

For a given ball screw's pitch, the programmable frequency divider 5 can select a proper frequency division ratio with the aid of the data input/output device 2.

The operation of the programmable frequency divider 5 will now be described in more detail.

Figure 7:
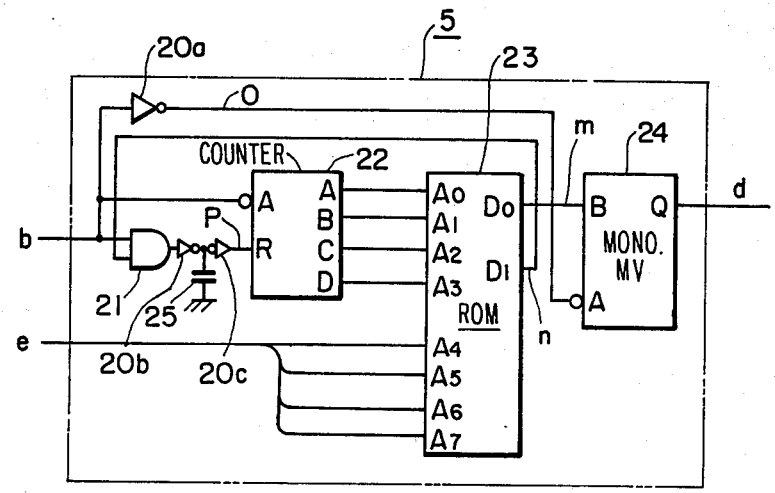
FIG. 7 is a block diagram showing a programmable frequency divider.
Figure 8:
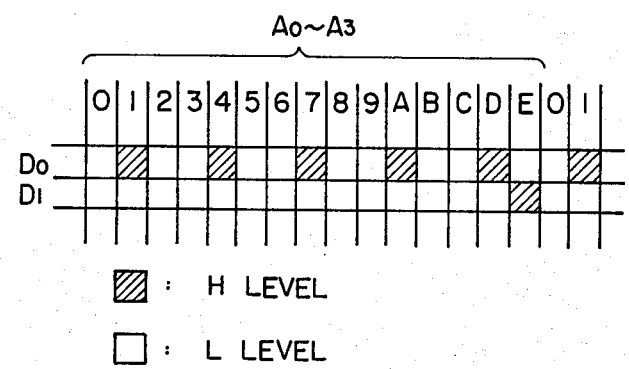
FIG. 8 is a diagram showing the contents of data in a ROM when the frequency division ratio is 5:15.

One circuit example of the programmable frequency divider 5 is as shown in FIG. 7. In this case, the frequency division ratio is, by way of example, 5:15; that is, one pulse is outputted for every three pulses. In a ROM (read-only memory) 23, the following data are provided as data $D_0$ and $D_1$ in correspondence to an address signal $A_0$-$A_3$ as shown in FIG. 8:

| Address Signal | | Content of Data |
|---|---|---|
| $A_7A_6A_5A_4$ | $A_3A_2A_1A_0$ | (for divide-by-three) |
| X | $0_{16}$ | $0_{16}$ |
| X | 1 | $1_{16}$ |
| X | 2 | $0_{16}$ |
| X | 3 | $0_{16}$ |
| X | 4 | $1_{16}$ |
| X | 5 | $0_{16}$ |
| X | 6 | $0_{16}$ |
| X | 7 | $1_{16}$ |
| X | 8 | $0_{16}$ |
| X | 9 | $0_{16}$ |
| X | A | $1_{16}$ |
| X | B | $0_{16}$ |
| X | C | $0_{16}$ |
| X | D | $1_{16}$ |
| X | E | $2_{16}$ | where X is a portion of the address specified from the signal e to select a frequency division ratio.

A monostable multivibrator 24 has the following truth table:

| TRIGGER | INPUT | OUTPUT |
|---|---|---|
| B | A | Q |
| H | H→L | ⎍ |
| L | H→L | L |

In FIG. 7, a resistor and a capacitor for determining the pulse width tw of the monostable multivibrator 24 are not shown for simplification.

The operation of the frequency divider 5 will now be described with reference to FIGS. 7 and 9.

The trailing edge of each distance measuring pulse b is counted by a 4-bit binary counter 22, the count output A, B, C, D of which is employed as the address signal $A_0$, $A_1$, $A_2$, $A_3$ of the ROM 23. The ROM 23 outputs the data $D_0$ and $D_1$ corresponding to the address signal after a predetermined delay time tR. The data $D_0$ is applied to a terminal B of the monostable multivibrator 23, and the data $D_1$ is applied to an AND circuit 21. On the other hand, the distance measuring pulse b is applied through an inverter circuit 20a to a terminal A of the monostable multivibrator 24.

Figure 9:
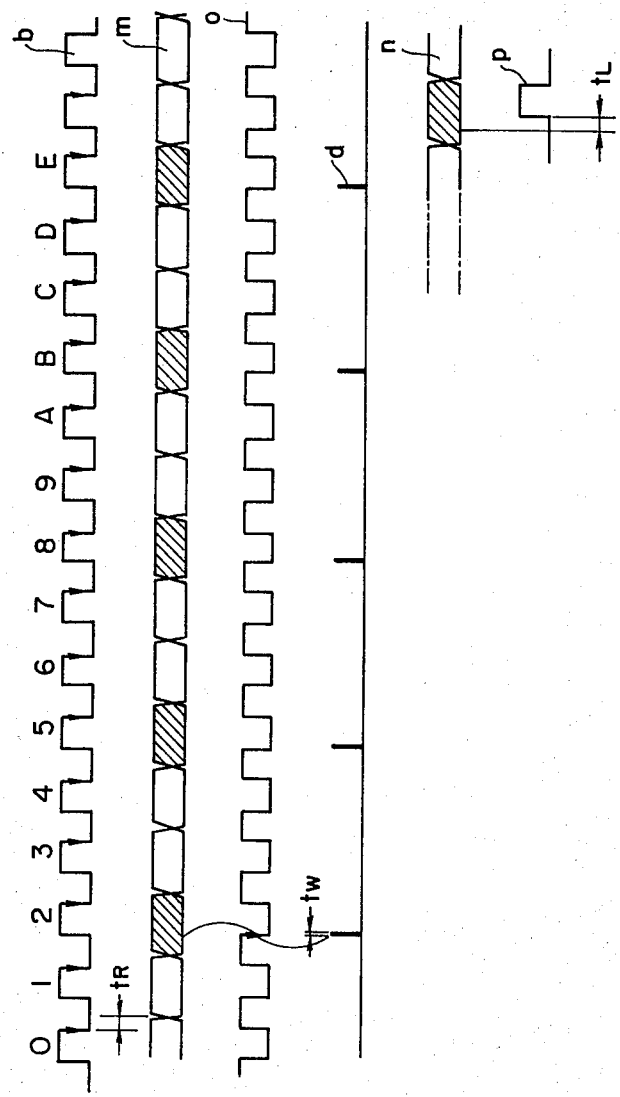
FIG. 9 is a timing chart for a description of the programmable frequency divider (5)

Thus, the monostable multivibrator 24 outputs the interruption pulse d according to the above-described truth table, as shown in FIG. 9.

The monostable multivibrator 24 produces the interruption pulse d having the predetermined pulse width tw in synchronization with the "H" level of the data $D_0$ (m) and the fall of the inversion signal o of the distance measuring pulse b. If, in this case, the data $D_0$ (m) is at "0" (="L"), no interruption signal d is produced. When the address signal of the ROM 23 reaches E (in hexadecimal notation), the data $D_1$ (n) of the ROM 23 is raised to "1" (="H") and is applied to the AND circuit 21. The signal (n) and the distance measuring pulse b are ANDed by the AND circuit 21. The output of the AND circuit 21 is applied to the reset terminal R of the 4-bit binary counter 22 in a delay time tL which is defined by an inverter circuit 20b, a delay capacitor 25 and an inverter circuit 20c, to reset the counter 22. The delay time tL is provided so as to produce the interruption pulse d and to reset the counter 22 when the address signal of the ROM 23 is E (in hexadecimal notation) and the data $D_0$ (m) is at "1" (="H"). Thus, the count data of the 4-bit binary counter 22 is erased whenever fifteen (15) distance measuring pulses b are provided.

As is apparent from the above description, a frequency division ratio can be provided for the programmable frequency divider 5 as desired by writing a code corresponding to the frequency division ratio in the ROM 23. In this example, fifteen different frequency division ratios: 1:15, 2:15, ... 14:15 and 15:15 are possible, with selection of the frequency division ratio being carried out by the address signal $A_4$, $A_5$, $A_6$, $A_7$ (e) of the ROM 23.

A position detecting system according to the stored program system will now be described.

As shown in FIG. 2, the microprocessor 6, the control memory 7 and the data memory 8 are coupled directly to the address bus g, the data bus h and the control bus i of the microprocessor 6, and the data input/output device 2 can set desired detection points for an optimum number of positions and a plurality of switch outputs corresponding to the positions by the storage of suitable data into the data memory 8.

It is assumed that the microprocessor 6 is an 8-bit microprocessor. In this case, the data bus h is of eight bits.

Figure 1:
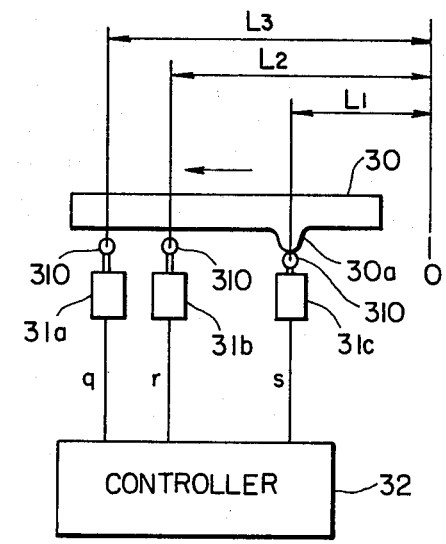
FIG. 1 is an explanatory diagram showing a conventional position detecting device using limit switches.
Figure 3:
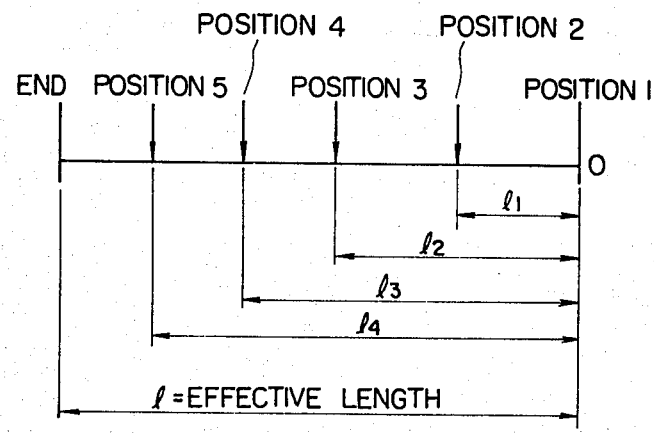
FIG. 3 is an explanatory diagram showing relationships between position numbers and distances set for the position numbers.

If the position measurement and control region, as shown in FIG. 3, has an effective length 1 from the original point to the advancement end, then, e.g. five position detection points can be set within the effective length and eight bit switch outputs can be set for these positions. For each of the positions 2, 3 and 4, the switch outputs may be provided slightly to the right of the detection points as the object moves to the left, and slightly to the left as the object moves to the right, i.e. always slightly in advance of the detection point. It goes without saying that the effective length can be changed as desired.

Now, the switch output will be described. In FIG. 2, reference character j designates the switch output data. Being coupled directly to the data bus h, the switch output data may include eight bit outputs simultaneously. Each bit, if desired, could be used to implement a different control function, so that the detection device of the present invention can also perform some of the control functions which would normally be performed by an additional unit.

As shown in FIG. 4, switch output data are set for five position detection points, respectively. The switch output data $01_{16}$ is of a hexadecimal notation; that is, it can be expressed in binary notation as follows:

| $DB_7$ | $DB_6$ | $DB_5$ | $DB_4$ | $DB_3$ | $DB_2$ | $DB_1$ | $DB_0$ |
|---|---|---|---|---|---|---|---|
| 0 | 0 | 0 | 0 | 0 | 0 | 0 | 1 | where $DB_0$ through $DB_7$ are eight bits on the data bus h. The designation $01_{16}$ for the first region is not necessary, e.g. the switch output for any region could be different if desired.

The microprocessor receives position numbers, distance data and switch output data shown in FIG. 4 from the data input/output device 2 through the two-way bus coupler 11 and stores the data in the data memory 8 in advance, with the aid of a suitable and straightforward control program stored in the control memory 7. After the data have been stored in the data memory 8, the data input/output device 2 together with the bus 1 can be mechanically removed from the two-way bus coupler 11.

The switch output data j in FIG. 4 are maintained held for the positional intervals as shown in FIG. 5. When the table or the like passes from one region to another, the position number is changed, and the switch output data of the position is delivered out by the switch output circuit 12. For example, when the table is moving to the left in FIG. 5 and passes the position 2, the position number provided to the switch 12 will change from "1" to "2" and accordingly the position data provided at the output of switch 12 will change from $01_{16}$ to $02_{16}$. Therefore, when a reciprocation operation is carried out between the original point and an advancement position, the same switch output data j is provided at a particular position from the original point regardless of the moving direction.

A position detecting method for the position detecting device according to the stored program system will now be described. A position is detected according to a closest position detecting system as shown in FIG. 6. That is, the present position is compared with the distance data of a closest position number set in the direction of advancement or in the direction of movement towards the original point (hereinafter referred to as "the advancement direction" or "the original point direction", respectively, when applicable).

When the present position is between positions 1 and 2, in the case of the table moving in the advancement direction, the present position is compared with the distance data of the position 2, and in the case of the original point direction, the present position is compared with the distance data of the position 1. The position 1 is at the original point, and its distance data is 0 mm.

When the present position is between the position 2 and a position 3, it is compared with the distance data of the positions 3 and 2, respectively. This operation is carried out by a simple control program stored in the control memory 7, which is shown in FIG. 10. As shown in FIG. 10, for example, the microprocessor at the occurrence of each interruption pulse d examines the direction of movement signal c and either increments or decrements its count value as appropriate and then compares the count value with the count value representing the nearest detection point in the direction of movement, or rather the location in advance of the nearest detection point at which a detection signal should be provided. If there is coincidence, e.g. if the count value matches the count value representing a point slightly in advance of one of the detection points, then the identity of the detection point indicated at the output of the switch 12 is changed under the control of the microprocessor by changing the switch output to the appropriate value as shown in FIG. 5. Now, for particular setting conditions and limitations on the system with respect to the setting conditions, the operation of the position detecting device will be described with reference to FIG. 2.

The setting conditions are as follows:

(1) A linear encoder is employed as the position detecting sensor 13, and a distance displacement per forward or reverse rotation pulse is 0.05 mm. In FIG. 5, in the case of the advancement direction, a forward rotation pulse is produced, and in the case of the original point direction, a reverse rotation pulse is produced. The frequency division ratio of the programmable frequency divider 5 is 1:1. Therefore, the forward/reverse rotation pulse train a, the distance measuring pulse train b and the interruption pulse train d are equal in the number of their pulses. In this case, the contents of the address signal $A_0, \ldots A_3$ and the data $D_0$ and $D_1$ of the ROM 23 in FIG. 7 are as indicated below:

| | Address signal $A_0 \ldots A_3$ (hexadecimal notation) | | | | | | | |
|---|---|---|---|---|---|---|---|---|
| | 0 1 2 3 4 5 6 7 8 9 | A | B | C | D | E | | |
| Data $D_0$ | 1 1 1 1 1 1 1 1 1 1 | 1 | 1 | 1 | 1 | 1 | | |
| Data $D_1$ | 0 0 0 0 0 0 0 0 0 0 | 0 | 0 | 0 | 0 | 1 | | |

("1" = "H" level, and "0" = "L" level)

(2) It is assumed that an absolute original point signal from the position detecting sensor 13 is delivered out as the external control signal k. When the signal is applied through the input/output isolation circuit 3B and the programmable input/output circuit 9 to the microprocessor 6 and is detected by the latter 6, the present distance data is forcibly set to 0 mm.

(3) The feed speed corresponds to the speed of movement of the input side of the position detecting sensor 13 and varies from 0 (stop) to 20 m/min.

Let us consider the limitations on the system from the above-described setting conditions. What are considered as the limitations are a processing time for a position detecting program shown in FIG. 10, and a bit length of a measuring counter and a memory for storing distance data.

The highest feed speed = 20 m/min = 333 m/sec. Therefore, the highest frequency $F_{MAX}$ of the pulse train from the position detecting sensor 13 is:

$$F_{MAX} = 333 \text{ mm}/0.05 \text{ mm} = 6660 \text{ Hz}$$

Therefore, the pulse period T at $F_{MAX}$ is:

$$T = 1/6660 \approx 150 \text{ } \mu s$$

Since the longest measuring distance is 1000 mm, it is necessary to count and store 20,000 pulses (= 1000 mm/0.05 mm) in order to measure up to 1000 mm. Therefore, the bit length n is fifteen (15) since this is the smallest number such that from $2^n \geq 20,000$.

Thus, the following processes (as shown in FIG. 10) must be achieved in T = 150 μs.

(1) The direction of the forward/reverse rotation pulse from the position detecting sensor 13 must be discriminated.

(2) According to the direction, ±1 must be added to the present distance data which is obtained by counting the interruption pulses d.

(3) The present distance data must be compared with the distance data corresponding to one of the predetermined position numbers and must be stored in the counter, and when coincidence is detected, the relevant switch output data j must be delivered out by the switch output circuit 12.

The register of the microprocessor 6 and the data memory 8 may be used as the 15-bit measuring counter and the memory.

The operation will now be concretely described with reference to FIG. 2. The position displacement is applied, as a forward or reverse rotation pulse a according to the advancement direction or the original point direction, respectively, to the direction discriminating circuit 4 by the position detecting sensor 13. The direction discriminating circuit 4 supplies the direction discrimination signal c to the programmable input/output circuit 9. Thus, the microprocessor 6 and the control memory 7, being able to receive the direction discrimination signal c directly from the input/output circuit 9, can determine the direction.

On the other hand, the forward or reverse rotation pulse a is applied, as the distance measuring pulse b, to the frequency divider 5. As is apparent from the above-described setting conditions, the frequency division ratio of the frequency divider 5 in this example is 1:1, and the pulse trains b and d are the same. The frequency division ratio is determined by the application of the frequency division ratio selection signal e from the input/output circuit 9. This ratio can be stored in the device 9 via the devices 2 and 11 as described above, or it can be provided through the I/O device 9 by the microprocessor or control memory 7.

Whenever one interruption pulse d is applied to the microprocessor 6, the microprocessor 6 performs the program shown in FIG. 10 which may be one of several control programs in the control memory 7.

Thus, before the next interruption pulse d is applied, the direction discrimination signal c is received from the input/output circuit 9 to determine the direction, and one (1) is added to or subtracted from the present distance data separately according to whether the direction thus determined is the advancement direction or the original point direction, while the present distance data is compared with data in the data memory 8 to determine if it coincides with the advance warning position of the closest detection point position number. When those data coincide with each other, the corresponding switch output data j identifying the particular detection point is outputted through the switch output circuit 12. If those data are not coincident with each other, the ordinary control program operation continues, so that the ordinary process program is carried out until the next interruption pulse d is applied.

In the above-described embodiment, the absolute original point signal supplied from the position detecting sensor 13 is employed as the external control signal k. However, in addition to the absolute original point signal, other various external control signals can be additionally provided and can be readily applied to the microprocessor 6 through the input/output circuit 9.

In the position detecting device of the invention, as described above, a desired number of position detection points and a plurality of switch outputs for each position detection point can be set, and the change of the detection points, the change of the switch output data, the change of the ball screw (feed screw) pitch and the change of the magnetic scale of the linear encoder can be dealt with via the operation of the data input/output device 2 in a very short time, independently of the remaining devices.

Thus, the position detecting device of the invention is flexible in operation, high in accuracy, high in response, and free from error even though it operates in both reciprocating directions.

Furthermore, in the position detecting device, the numbers of external control signals k and switch output data j can be readily increased owing to its arrangement. Therefore, according to the invention, a positioning device including the direct control of drive sources (a DC motor, a pulse motor and an AC motor) can be readily realized. It should be appreciated that the functions performed by the microprocessor and other components are all very simple logic operations and need not be described in greater detail herein. Indeed, due to the extreme simplicity, i.e. mere increment-and-compare, of the system operation, the microprocessor could be replaced by suitable logic circuitry without departing from the spirit and scope of this invention.

What is claimed is:

1. A position detecting device for detecting the position of a movable object within a movement range comprising:
   means for generating a train of distance pulses in accordance with movement of said object;
   means for counting said pulses to generate a position signal representing the position of said object; and
   means, responsive to said position signal, for generating at least one switch output at a plurality of different count values of said position signal;
   wherein said means for generating comprises:
   a data memory for storing switch output data representing said at least one switch output at a plurality of address locations;
   means for addressing said memory in accordance with said count values; and
   means for providing said at least one switch output in accordance with the contents of addressed memory locations;
   wherein said means for generating the train of distance pulses comprises:
   a pulse generator for generating movement pulses in accordance with object movement; and
   a programmable frequency divider for receiving said movement pulses and providing a lower frequency distance pulse train output to be supplied to said means for counting; and
   wherein said programmable frequency divider comprises:
   a count memory addressed both by the output of said second counting means and also by a signal representing a desired frequency division ratio; and
   a monostable multivibrator receiving an output of said count memory as an input and being clocked by said movement pulses, the output of said monostable multivibrator comprising said distance pulses.

2. A position detecting device as claimed in claim 1, wherein said means for counting and means for addressing comprise a microprocessor.

3. A position detecting device as claimed in claim 1, wherein said data memory is programmable, further comprising means for selectively changing said switch output data and the address of said switch output data in said data memory.

4. A position detecting device as claimed in claim 1, wherein said data memory is addressed further in accordance with the direction of movement of said object and said means for providing provides different switch outputs for a portion of the position signal of said object depending upon the direction of travel.

5. A position detecting device as claimed in claim 1, wherein each of said switch comprises a plurality of bits.

6. A position detecting device as claimed in claim 1, wherein said means for counting counts said distance pulses in a direction corresponding to the direction of movement of said object.

7. A position detecting device as claimed in claim 1, further comprising direction detecting means for receiving said movement pulses and providing an output indicating the direction of movement of said object.

8. A position detecting device for detecting the position of a movable object, comprising:

direction discriminating means for receiving a pulse train signal including forward movement direction pulses and reverse movement direction pulses to produce a direction discriminating signal and a first pulse signal indicative of the distance moved;

programmable frequency divider means for receiving the first pulse signal and a frequency-division ratio-selecting signal to produce a frequency-divided pulse signal which is obtained by subjecting the first pulse signal to frequency division in accordance with the frequency-division ratio-selecting signal, said divider means comprising means for counting the first pulse signal, memory means for receiving the output signal of said counting means as an address signal and the frequency division ratio selecting signal, and for providing an output signal representative of data stored in an address of said memory means, which address is assigned by the address signal, and monostable multivibrator means for receiving the output signal from said memory means and the first pulse signal to produce the frequency-divided pulse signal; and controlling means comprising data memory means for storing position number data, distance data and switch output data, said controlling means receiving the frequency-divided pulse signal and the direction discriminating signal and providing the switch output data obtained by subjecting the received signals and the data stored in said data memory means to a calculation in accordance with a predetermined control program.

* * * * *